United States Patent
Smith

[11] 3,893,443
[45] July 8, 1975

[54] FLOATING SOLAR POOL HEATER
[76] Inventor: Richard H. Smith, 30 Bater Rd., Hillsborough, Calif. 94010
[22] Filed: Jan. 11, 1973
[21] Appl. No.: 322,792

[52] U.S. Cl. .............................. 126/271; 4/172.12
[51] Int. Cl. .............................................. E04n 3/19
[58] Field of Search......... 4/172.11, 172.12, 172.14; 126/271, 270

[56] References Cited
UNITED STATES PATENTS

| | | | |
|---|---|---|---|
| 2,843,536 | 7/1958 | Mount | 126/271 UX |
| 3,029,806 | 4/1952 | Okuda | 126/271 |
| 3,072,920 | 1/1963 | Yellot | 126/271 X |
| 3,077,190 | 2/1963 | Allen | 126/271 |
| 3,154,139 | 10/1964 | Hager, Jr. | 126/271 X |
| 3,453,666 | 7/1969 | Hedgers | 126/271 X |
| 3,683,428 | 8/1972 | Morris | 4/172.14 |

FOREIGN PATENTS OR APPLICATIONS
13,780 6/1928 Australia.......................... 4/172.12

*Primary Examiner*—William F. O'Dea
*Assistant Examiner*—Peter D. Ferguson

[57] ABSTRACT

A floating solar heater for swimming pools has side walls, end walls and a bottom forming a pan-like vessel having a shallow chamber and capable of floating on the surface of the pool. Inside surfaces of the walls and bottom are black in color and outside surfaces are lighter. Over the top of the side and end walls is a translucent cover closing the chamber in the vessel to form a substantially dead air space and sealed sufficiently at the edges to prevent water entering the chamber in a sufficient amount to sink the vessel or impair the heating action.

7 Claims, 5 Drawing Figures

PATENTED JUL 8 1975　　　　　　　　　　　　3,893,443

FLOATING SOLAR POOL HEATER

To secure maximum enjoyment of the average home swimming pool, especially throughout the spring and fall seasons, some form of heater for the pool water is needed. Although this can be readily accomplished by commercially available heaters fired by fuel such as gas or oil, the cost of fuel for keeping such a large body of water at temperatures ranging between 78° and 86°, depending upon the taste of the user, is higher than can be afforded by the average pool owner.

Some resort has been had to solar heating as an expedient for holding pool water at a comfortable swimming temperature with indifferent success. Some expedients which have been resorted to have been the employment of coils of pipe or tubing exposed on the roof of the building and connected to the pool circulating water supply. Some heat is, in fact, captured by this expedient. Such a system naturally requires power to pump pool water through the pipes and then back into the pool. Flat shallow reservoirs, both covered and uncovered, have a comparable result and comparable deficiencies.

Other expedients have included flexible covers pulled over the pool, the covers being of various heat-absorbing materials. These also have their limitations in that such material normally has a specific gravity greater than water and will sink below the surface unless adequate means are provided to support it at the sides and ends. Usually this also means that such a cover must extend entirely over the pool when in use and, consequently, may become cumbersome to remove when the pool is to be used and to replace it afterward. Also large sheets of such material as may be available for such an expedient deteriorate rather rapidly upon constant exposure to the sun and elements.

It is therefore among the objects of the invention to provide a new and improved solar heating device for such uses as heating swimming pools which is light, inexpensive and of such construction that it is able to capture substantially a maximum amount of solar energy which impinges upon it.

Another object of the invention is to provide a new and improved solar heating means for the water of swimming pools which floats upon the water when in use, is therefore easy to move about in the pool, and also easy to remove from the pool entirely when the entire pool is to be used and just as easy to replace after use has been discontinued.

Still another object of the invention is to provide a new and improved floating solar heating unit for heating pool water which is sufficiently effective in capturing the heat of the sun and passing it to the water that only a portion of the surface of the pool need be covered with the unit thereby making it unnecessary on at least some occasions to remove the heating units from the pool when the pool is to be used.

Still another object of the invention is to provide a new and improved floating solar heating vessel for heating swimming pool water which can be built in relatively small units making them easy to handle and also one which, by reason of being built in separate individual units, can be supplied in sufficient numbers to cover a desired area of the surface of the pool and also to be shifted about the pool surface to one location or another depending upon the use to which the pool is being put.

Further included among the objects of the invention is to provide a new and improved individual type floating solar heating pan which can be made of readily available, relatively inexpensive material and which is of such construction that solar rays are readily captured by the pan and trapped in the pan thereby to heat the pool water at a relatively high efficient rate, not only when sunlight is actually falling upon the surface of the pan but also on cloudy days when there are effective sun rays, not readily visable to the eye, but, of such character that they do pass appreciable heat to a properly constructed heating pan.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
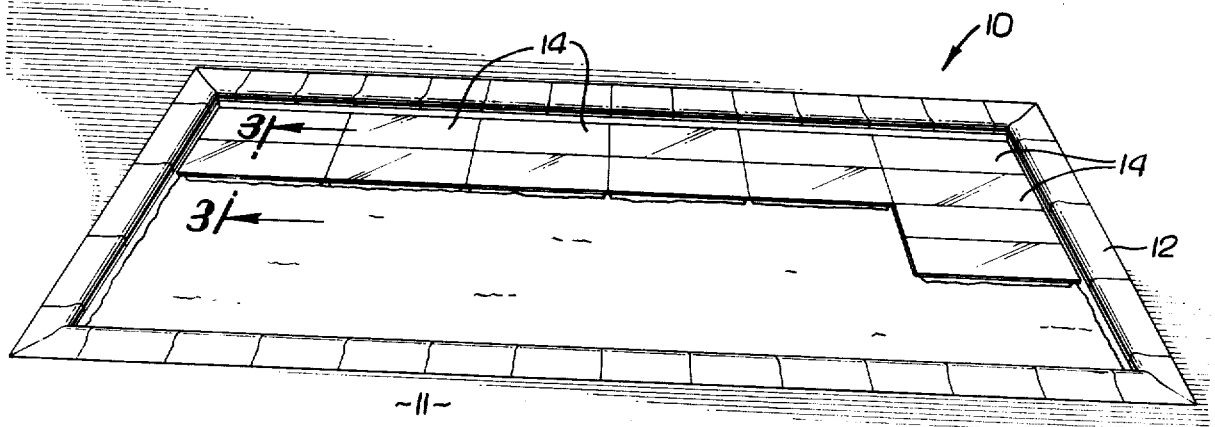
FIG. 1 is a perspective view of a substantially conventional swimming pool showing a number of the devices floated into position covering a portion of the surface of the water.
Figure 2:
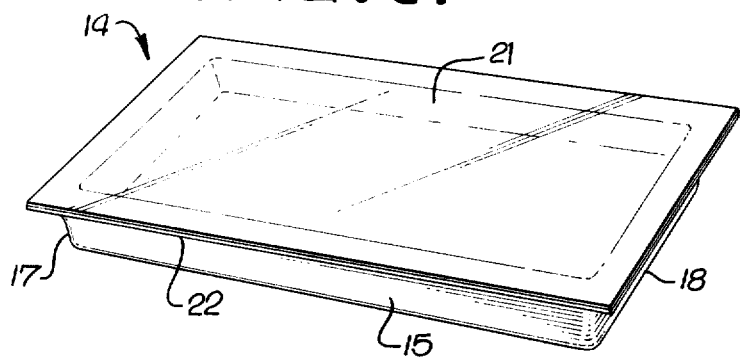
FIG. 2 is a side perspective view of one unit.
Figure 3:
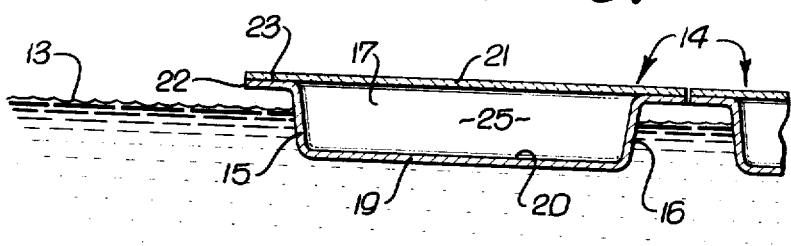
FIG. 3 is a fragmentary cross sectional view taken on the line 3—3 of FIG. 1.

In an embodiment of the invention chosen for the purpose of illustration, there is shown a substantially conventional swimming pool indicated generally by the reference character 10 around which is a pool deck 11 and a coping 12 at the edge of the pool itself.

In the pool and floating on the surface 13 is a plurality of units 14 consisting of floating pans, the units being distributed over a portion only of the pool surface.

The units in the chosen embodiment are rectangular although it will be appreciated that the precise geometrical perimeter may be varied to suit various conditions. It is of significance, however, that the units be of such geometrical perimeter as will allow them, when either partially or completely filling the pool, to be fitted in side-by-side or end-to-end alignment when desired and also be capable of fitting one side or another of the pool as a matter of convenience in use.

More specifically, each of the units in the chosen embodiment consists of a shallow pan formed of side walls 15 and 16 and ends walls 17 and 18. At lower edges of the side and end walls is a bottom wall 19, the bottom wall having a blackened surface 20 on the inside. When the pan is made of metal with good heat conducting characteristics such as aluminum, the blackened surface may be an anodized surface. When the pan is made of fiber glass reinforced plastic resin or one or another of the commercially available and expedient types of synthetic plastic resin, the blackened surface may be a film applied either by painting or by some other appropriate means compatible with the material used.

Extending over the top edges of the side and end walls is a transparent or translucent cover 21. It has been found advantageous to provide the side and end walls with outwardly bent flanges 22 whereby to present flat areas 23 upon which outer portions of the cover 21 may rest. By the construction described there is provided a chamber 25 which is a relatively thin dead air space in the proportions shown and described where the height of the side and end walls is about one and one quarter inches and the aggregate area of the cover 21 is about ten square feet. It is advantageous also to have the cover 21 in sealed engagement with the flat areas 23 thereby to provide a floating vessel which will not ship water as well as providing the chamber 25 from which heated air cannot escape.

The material of the cover 21 should be either of glass or preferably one of the transparent or translucent synthetic plastic resin materials of a type capable of permitting the short rays of the sun to pass through it and thereafter be absorbed by the blackened surface. In this arrangement the long rays emitted by the blackened surface under operating conditions cannot pass back out through the transparent cover. Accordingly the short rays are readily converted to heat which is then conducted through the bottom of the pan directly to the pool water surface. The structure described produces what has been frequently termed a "greenhouse effect."

Although a metal pan is capable of commencing the operation of conducting heat to the pool water surface more quickly, once the cycle starts it is of no material consequence for effective heating whether the pan be of a metallic material or one of the commercial varieties of synthetic plastic resin.

Figure 4:
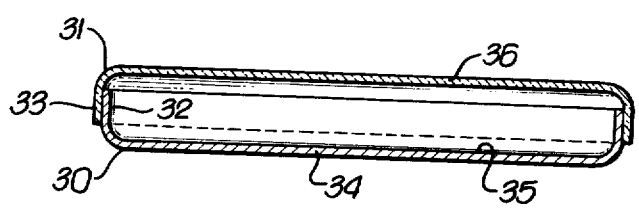
FIG. 4 is a cross sectional view of a modified form of the device.

In FIG. 4 is shown another form of vessel consisting of a lower pan 30 and an upper pan 31. In this case a side wall structure 32 of the lower pan is nested within a side wall structure 33 of the upper pan, the side wall structures being in snug engagement with each other and, preferably, sealed. Here also a bottom wall 34 has an upper blackened surface 35, and the side wall structure 33 of the upper pan is provided with a wall structure 36 which has the characteristics described in connection with the cover 21 namely being of transparent or translucent glass or plastic of such character as is capable of passing the short rays of the sunlight and preventing the passage of long rays.

Figure 5:
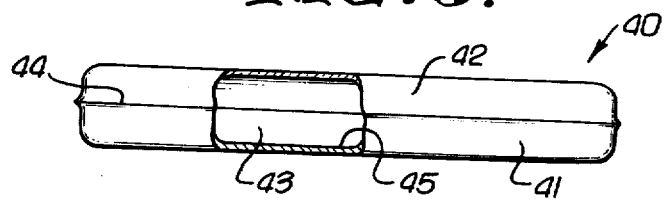
FIG. 5 is a cross sectional view of another form of the device.

In the embodiment of the invention of FIG. 5, there is shown a vessel 40 consisting of lower and upper halves 41 and 42 respectively of a pan-like structure which may be molded so as to provide a closed chamber 43. If the vessel is integrally molded normally there will be a flash line 44 between the lower and upper halves. Should the halves be molded separately, they may be joined and sealed along the line 44. In this instance, also, the inside surface of the lower half will be a blackened surface 45 and the bottom of the upper half will be transparent or translucent material of a type capable of permitting passage of the short rays of the sun and denying passage to long rays.

Constructed as shown, the vessels or units are all buoyant and can be constructed of relatively thin-walled lightweight and inexpensive materials. Used as movable floating units supported buoyantly directly on the surface of the pool 10 and functioning as described, the units not only pass solar energy in the form of heat to the surface of the pool but also conserve heat by eliminating the primary causes of heat loss, namely, evaporation of water from the pool and radiation of heat from the water of the pool to cooler air above. Under such circumstances, no evaporation can take place over that portion of the surface covered by the vessels and virtually no water heat will be radiated back through the pan. Added collateral advantages include a reduction in the amount of dirt and debris falling into the pool inasmuch as the vessels or pans act as a cover over a portion of the pool aggregating in area the sum total of areas of the pans.

When the pool is in use the solar pool heating pans, being relatively light in weight, can be lifted out of the pool and left on the pool deck. For limited use of the pool, the pans may in fact be left in place inasmuch as a sufficient amount of heating for most of the uses can be achieved by covering only one quarter to one-third of the surface. The amount of surface covered can be varied to stabilize the pool water temperature at a level found acceptable. Hence, no elaborate controls need be used but the result arrived at by using a greater or lesser number of the pans.

Pans of the type herein described by tests have been found to be capable of absorbing and passing to the surface water of the pool about 150 B.T.U. per hour per square foot of pan surface. A convenient size for a rectangular pan has been found to be two feet by five feet. Although rectangular pans which can be pushed into side-by-side or end-to-end positions have certain advantages, effective heating can be achieved by pans of perimetral configuration which do not, in fact, permit them to interfit one with another. It is the area of pool surface covered which is instrumental in achieving the heating effect desired, hence, the geometric configurations of the pans as well as some decorative motif on the cover can be taken advantage of.

While the invention has herein been shown and described in what is conceived to be a practical and effective embodiment, it is recognized that departures may be made therefrom within the scope of the invention, which is not to be limited to the details disclosed herein but is to be accorded the full scope of the claim so as to embrace any and all equivalent devices.

Having described the invention, what is claimed as new in support of Letters Patent is:

1. The combination of a pool of selected length and width and a floating solar heater means, said heater means comprising a plurality of separate individual heater units each having opposite sides of uniform length and opposite ends of uniform length and with sides and ends respectively of shape complementary to each other and to the sides and ends of the pool; the distance between sides of each unit being many times less than the width of the pool and the distance between ends of each unit being many times less than the length of the pool whereby a multiplicity of said separate individual units are used for the pool, each unit comprising a fixed side wall structure, a fixed bottom structure and a fixed top wall structure joined to form a relatively rigid shallow vessel with a chamber inside of uniform depth wherein air is at substantially ambient pressure, wall elements of the side wall structure comprising stiffening means, said top wall structure comprising a translucent sheet sealed at the edges to said sides and ends adjacent one edge of the side wall structure substantially closing said chamber, one of said wall structures having elements at sides and ends of each unit extending beyond the immediately adjacent wall structure whereby to provide mutual areas of abutment at sides and ends of adjacent units, there being a substantially closed air space between sides and ends of adjacent units.

2. The combination as in claim 1 wherein the side wall structure and the bottom wall structure are integral with each other and the top wall structure rests on the top edge of the side wall structure.

3. The combination as in claim 1 wherein the side wall structure comprises side walls and end walls forming a rectangular vessel.

4. The combination as in claim 1 wherein the upper edge of the side wall structure is bent outwardly forming a flat area and the translucent sheet rests on the flat area.

5. The combination as in claim 1 wherein the side and bottom wall structure is made of non-ferrous sheet metal.

6. The combination as in claim 1 wherein both the side and bottom wall structure and the top wall structure are made from a synthetic plastic resin material and the top wall structure is sealed to the side wall structure of the vessell.

7. The combination as in claim 1 wherein the inner surface of the bottom wall structure is fixed in position and black in color, said top wall structure comprising a translucent sheet substantially closing said chamber.

* * * * *